United States Patent
Levin et al.

(10) Patent No.: US 11,558,376 B1
(45) Date of Patent: Jan. 17, 2023

(54) IDENTIFYING INTERNET OF THINGS DEVICES

(71) Applicant: ShieldIOT Ltd., Herziiya (IL)

(72) Inventors: Ohad Levin, Haifa (IL); Dan Feldman, Haifa (IL)

(73) Assignee: SHIELDIOT LTD, Herzliya (IL)

( * ) Notice: Subject to any disclaimer, the term of this patent is extended or adjusted under 35 U.S.C. 154(b) by 308 days.

(21) Appl. No.: 16/948,841

(22) Filed: Oct. 1, 2020

Related U.S. Application Data

(63) Continuation-in-part of application No. 16/586,985, filed on Sep. 29, 2019, and a continuation of application No. 16/947,204, filed on Jul. 22, 2020, now abandoned.

(60) Provisional application No. 62/748,462, filed on Oct. 21, 2018.

(51) Int. Cl.
    *H04L 9/40* (2022.01)
    *G06K 9/62* (2022.01)

(52) U.S. Cl.
    CPC ........ *H04L 63/0853* (2013.01); *G06K 9/6219* (2013.01); *H04L 63/102* (2013.01); *H04L 63/20* (2013.01)

(58) Field of Classification Search
    CPC ... H04L 63/0853; H04L 63/102; H04L 63/20; H04L 63/0884; G06K 9/6219; G06F 16/35
    See application file for complete search history.

(56) References Cited

U.S. PATENT DOCUMENTS

| | | | |
|---|---|---|---|
| 2006/0161592 A1* | 7/2006 | Ertoz | G06F 21/552 |
| 2016/0028750 A1* | 1/2016 | Di Pietro | H04W 12/125 |
| | | | 726/23 |
| 2017/0055913 A1* | 3/2017 | Bandyopadhyay | |
| | | | A61B 5/02416 |

(Continued)

OTHER PUBLICATIONS

Coresets for clustering (with Outliers) in doubling metrics, Lingxiao Huang et al, Proceedings—59th Annual IEEE Symposium on Foundations of Computer Science, IEEE (Year: 2018).*

*Primary Examiner* — Shanto Abedin
(74) *Attorney, Agent, or Firm* — William H. Dippert; Laurence A. Greenberg; Werner H. Stemer

(57) ABSTRACT

There may be provided a method that includes receiving or generating a first plurality (N) points within a first multi-dimensional space that has M dimensions; M being a positive integer that is smaller than N; wherein the N points represent one or more behaviors of the one or more IOT devices; wherein a clustering of the N points within the first multi-dimensional space results in at least some clusters that are inseparable from each other; generating a representation of the N points within a second multi-dimensional space that has at least N dimensions; wherein a clustering of the N points within the second multi-dimensional space results in clusters that are separable from each other; calculating projections of the N points on a sub-space that has a second plurality (Q) of dimensions; wherein Q is a function of a relationship between a number (K) of clusters and an allowed error (ε); computing a core-set that comprises a weighted subset of the projections; clustering the projections of the weighted subset to provide current clusters; and identifying the one or more IOT devices based on a relationship between the current clusters and identification information regarding IOT devices of known identity.

20 Claims, 7 Drawing Sheets

(56) References Cited

U.S. PATENT DOCUMENTS

2018/0375887 A1* 12/2018 Dezent ................. H04L 41/142
2020/0112571 A1*  4/2020 Koral ..................... G06N 3/08

* cited by examiner

Assigning probabilities to the N projections 162

For each projection of a cluster out of at least some projections of the cluster -
Probability(Projection) =
1/(Size of cluster) +
(Distance of projection to center of cluster)/(sum of distances from projections of the cluster to the center of the cluster) 163'

Selecting the subset based on the probabilities. Assigning weights to the N projections of the subset based on the probabilities 164

Weight(projection) = 1/(Probability(Projection) 165

IDENTIFYING INTERNET OF THINGS DEVICES

CROSS REFERENCE

This application is a continuation in part (CIP) of U.S. patent application Ser. No. 16/586,985 filing date Oct. 21, 2019 which claims priority from U.S. provisional patent Ser. No. 62/748,462, filed Oct. 21, 2018—both are incorporated herein by reference.

FIELD OF THE INVENTION

The present invention generally relates to identifying Internet of Things (IOT) devices.

BACKGROUND OF THE INVENTION

A network may include a vast amount of IOT devices. IOT devices may be dynamically added to the network and be dynamically removed from the network. The identities of the IOT devices may be determined for various reasons—including network traffic management and network security.

There is a growing need to monitor in an efficient manner, the IOT devices that belong to a network.

SUMMARY OF THE INVENTION

There are provided systems, methods and non-transitory computer readable mediums for identifying IOT devices.

There may be provided a method for identifying one or more internet of things (IOT) devices, the method may include receiving or generating a first plurality (N) points within a first multi-dimensional space that has M dimensions; M being a positive integer that is smaller than N; wherein the N points represent one or more behaviors of the one or more IOT devices; wherein a clustering of the N points within the first multi-dimensional space results in at least some clusters that are inseparable from each other; generating a representation of the N points within a second multi-dimensional space that has at least N dimensions; wherein a clustering of the N points within the second multi-dimensional space results in clusters that are separable from each other; calculating projections of the N points on a sub-space that has a second plurality (Q) of dimensions; wherein Q is a function of a relationship between a number (K) of clusters and an allowed error ($\varepsilon$); computing a core-set that comprises a weighted subset of the projections; clustering the projections of the weighted subset to provide current clusters; and identifying the one or more IOT devices based on a relationship between the current clusters and identification information regarding IOT devices of known identity.

There may be provided a non-transitory computer readable medium that stores instructions for: receiving or generating a first plurality (N) points within a first multi-dimensional space that has M dimensions; M being a positive integer that is smaller than N; wherein the N points represent one or more behaviors of one or more IOT devices; wherein a clustering of the N points within the first multi-dimensional space results in at least some clusters that are inseparable from each other; generating a representation of the N points within a second multi-dimensional space that has at least N dimensions; wherein a clustering of the N points within the second multi-dimensional space results in clusters that are separable from each other; calculating projections of the N points on a sub-space that has a second plurality (Q) of dimensions; wherein Q is a function of a relationship between a number (K) of cluster and an allowed error ($\varepsilon$); computing a core-set that comprises a weighted subset of the projections; clustering the projections of the weighted subset to provide current clusters; and identifying the one or more IOT devices based on a relationship between the current clusters and identification information regarding IOT devices of known identity.

There may be provided a computerized system that comprises a processing circuit and memory that are configured to cooperate in executing the steps of: receiving or generating a first plurality (N) points within a first multi-dimensional space that has M dimensions; M being a positive integer that is smaller than N; wherein the N points represent one or more behaviors of one or more IOT devices; wherein a clustering of the N points within the first multi-dimensional space results in at least some clusters that are inseparable from each other; generating a representation of the N points within a second multi-dimensional space that has at least N dimensions; wherein a clustering of the N points within the second multi-dimensional space results in clusters that are separable from each other; calculating projections of the N points on a sub-space that has a second plurality (Q) of dimensions; wherein Q is a function of a relationship between a number (K) of cluster and an allowed error ($\varepsilon$); computing a core-set that comprises a weighted subset of the projections; clustering the projections of the weighted subset to provide current clusters; and identifying the one or more IOT devices based on a relationship between the current clusters and identification information regarding IOT devices of known identity.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the embodiments of the invention. In this regard, the description taken with the drawings makes apparent to those skilled in the art how embodiments of the invention may be practiced. In the drawings:

FIG. 3 is an example of some steps of the method of FIG. 1;

DETAILED DESCRIPTION OF THE DRAWINGS

Figure 1:
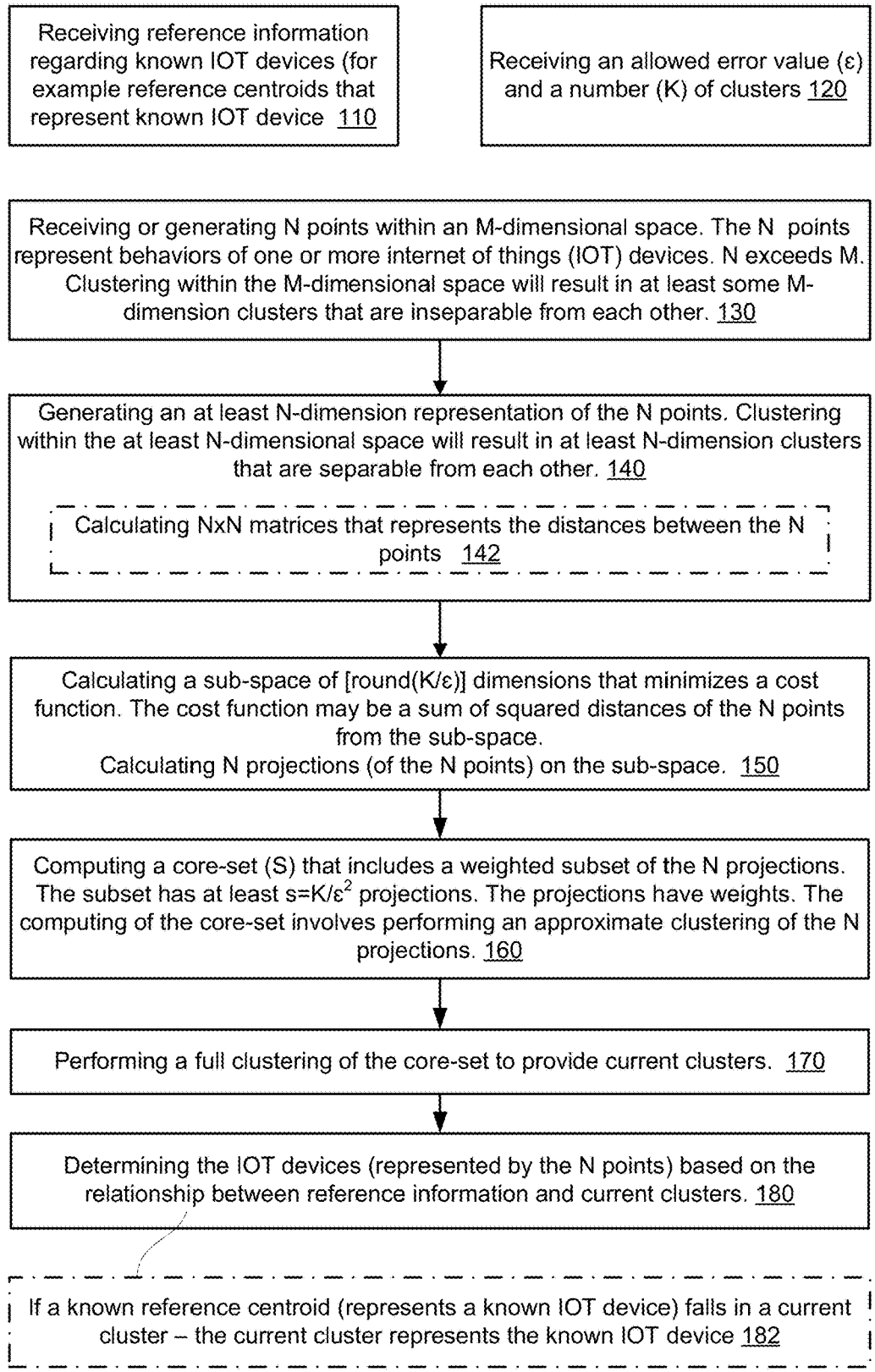
FIG. 1 is an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any claims may be provided.

Any combinations of systems, units, components, processors, sensors, illustrated in the specification and/or drawings may be provided.

Internet of Things (IOT) may be regarded as the extension of Internet connectivity into physical devices and everyday objects. Embedded with electronics, Internet connectivity, and other forms of hardware (such as sensors), these devices can communicate and interact with others over the Internet, and they can be remotely monitored and controlled. (wikipedia.org)

The definition of the Internet of things has evolved due to convergence of multiple technologies, real-time analytics, machine learning, commodity sensors, and embedded systems. Traditional fields of embedded systems, wireless sensor networks, control systems, automation (including home and building automation), and others all contribute to enabling the Internet of things. In the consumer market, IoT technology is most synonymous with products pertaining to the concept of the "smart home", covering devices and appliances (such as lighting fixtures, thermostats, home security systems and cameras, and other home appliances) that support one or more common ecosystems, and can be controlled via devices associated with that ecosystem, such as smartphones and smart speakers.

A computerized system may be an application software operable on a computerized unit or/and a computerized device comprising a memory unit coupled with a processing unit. The memory unit may be a computer-readable storage medium configured for storing data accessible by the central application software for processing the stored data. The processing unit may comprise at least one digital processor instructed to execute methods and process of the central application software.

There is provided a method, a system and non-transitory computer readable medium for identifying one or more internet of things (IOT) devices. The method is very effective in generating a compact representation of the behavior of IOT devices while accurately distinguishing between information related to the behaviors of different IOT devices. This provide a highly efficient solution that can be implemented using a fraction of the computational and/memory resources used in the past.

FIG. 1 is an example of method 100.

Method 100 may start by steps 110, 120 and 130.

Step 110 may include receiving reference information regarding known IOT devices. The reference information may include centroids that represent the IOT devices of known identity.

Step 120 may include receiving an allowed error value (c) and a number (K) of clusters centroids Step 130 may include receiving or generating a first plurality (N) points within a first multi-dimensional space that has M dimensions.

M being a positive integer that is smaller than N.

The N points represent one or more behaviors of the one or more IOT devices.

A behavior of an IOT device can, for example, be represented by values that represent communication from the IOT device and/or communication to the IOT device.

The behavior of an IOT device may be represented by data such as a communication-session key, Service ID, headers of the communication packet, content downloaded or uploaded by the device, number of bytes sent from a device, communication response time, the protocol utilized by the devices for communications, time stamp of initiating the communication, and the like. In some cases, the captured data may be captured by a computerized system designed to communicate with the devices and request the data therefrom. In some other cases the devices may be configured to automatically send the communication and operation behavior related data to a computer connected to a computer-readable medium designed to capture data in a computer readable format. In some cases, such datasets may be structured from large files and tables designed to be utilized by computerized processes. In some other cases the communication and operation behavior can be obtained by tapping the communication traffic at the network operator data center and communicated to computerized system hereof.

The data regarding the behavior of an IOT device (may be a dataset) may be converted to the N points by the computerized system, by the IOT device itself, or by an intermediate device between the IOT device and the computerized system.

Examples of gaining and pre-processing a data-set or any other information regarding is illustrated in U.S. patent application Ser. No. 16/586,985 filing date Oct. 21, 2019.

For example—each point may represent timing and/or size and/or any parameter related to packets associated with an IOT device. For example—step 130 may be an outcome of an analysis of multiple packets associated with an IOT device, the analysis result may be, for example, number of egress bites, number of ingress bites, timing information related to the packets—for example timing differences between packets.

Referring back to step 130—a clustering of the N points within the first multi-dimensional space results in at least some clusters that are inseparable from each other. Different clusters includes points attributed to different IOT devices. If a virtual border was drawn per cluster—to surround all points of the cluster—than this virtual borders would cover overlapping areas.

Figure 4:
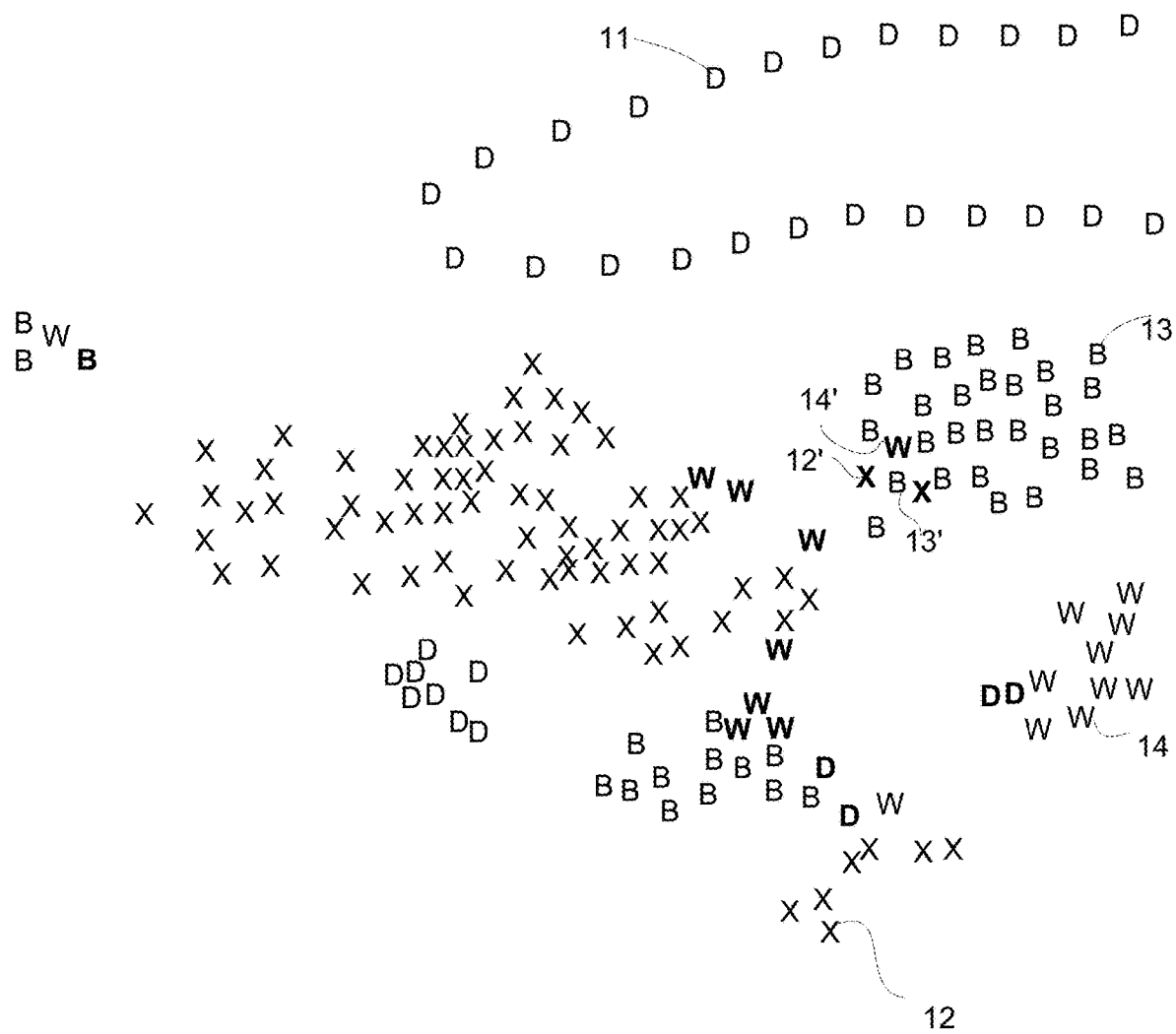
FIG. 4 is an example of inseparable clusters.

See, for example, FIG. 4 that illustrates points of four IOT devices—the points related to a first IOT device are denoted X 12, the points related to a second IOT device are denoted D 11, the points related to a third IOT device are denoted W 14, and the points related to a fourth IOT device are denoted B 13. Some of the points of the different clusters are arranged in an interleaved/intermixed manner—see 11' 12', 13' and 14.

Step 130 may be followed by step 140 of generating a representation of the N points within a second multi-dimensional space that has at least N dimensions; wherein a clustering of the N points within the second multi-dimensional space results in clusters that are separable from each other.

Step 140 may include or may be followed by calculating distances between each one of the N points to each other point of the N points.

Step 140 may be followed by step 150 of calculating projections of the N points on a sub-space that has a second plurality (Q) of dimensions. Q may be a function of a relationship between the number (K) of cluster and the allowed error ($\epsilon$)— both received during step 120. For example —Q may be a round value of K divided by $\epsilon$.

Step 150 may include calculating the sub-space to minimize a cost function. The cost function may be a sum of squared distances of the N points from the sub-space. Any other cost function may be applied.

Step 150 may be followed by step 160 of computing a core-set that comprises a weighted subset of the N projections. The subset includes a plurality (s) of projections. The values of s may be a function of K and $\epsilon$. For example—s may not be smaller than a round value of $s=K/\epsilon^2$. The projections have weights. The computing of the core-set may involve performing an approximate clustering of the N projections.

While step 140 may include performing a full clustering of the projections, step 160 may include performing only an approximate clustering of the projections.

Step 160 may be followed by step 170 of clustering the projections of the weighted subset to provide current clusters.

Step 170 may be followed by step 180 of identifying the one or more IOT devices based on a relationship between the current clusters and the reference information.

The identifying may include at least one out of—identifying the type of the IOT device (for example a sensor, a heat sensor, a camera, a refrigerator, an oven, and the like), identifying the type and additional identifying parameter (for example a sensor and its manufacturer and/or its model and/or its line of products, sensor and its serial number, and the like).

Step 180 may include searching for at least one centroid that falls within at least one current cluster.

Figure 5:
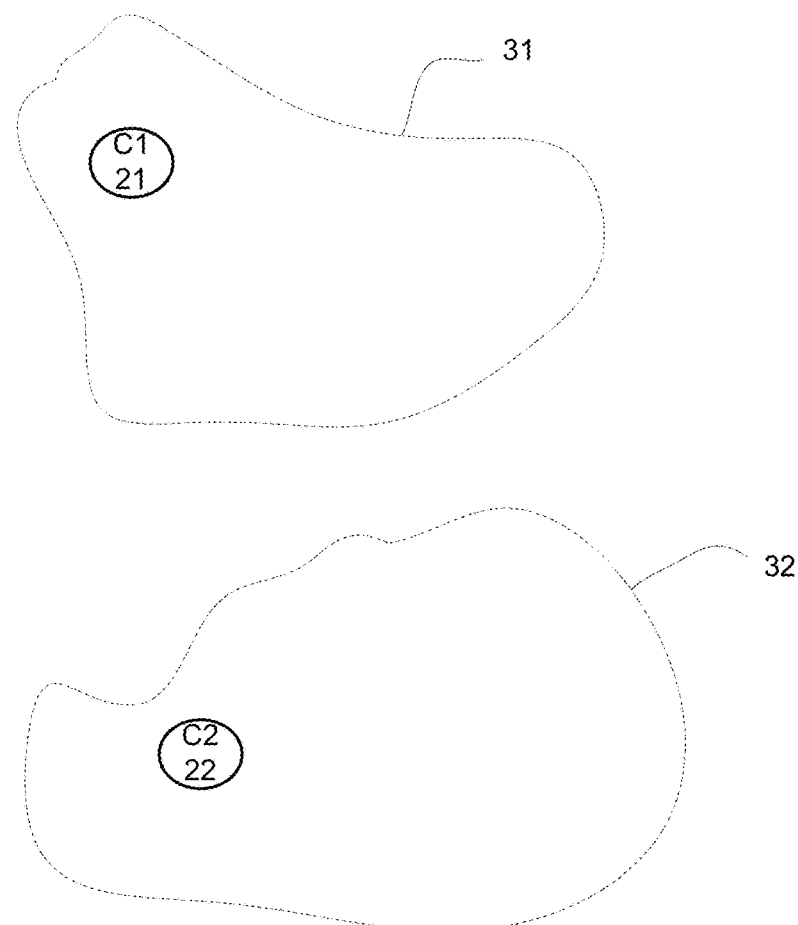
FIG. 5 is an example of centroids of known IOT devices and of clusters of a core-set.

Referring to FIG. 5—a first centroid C1 21 is of a certain type of temperature sensors. C1 21 falls within a cluster related to a first monitored IOT device—so that the first monitored IOT device is identified as being of the certain type of temperature sensors.

A second centroid C2 22 is of a certain brand of cameras. C2 22 falls within a cluster related to a second monitored IOT device—so that the second monitored IOT device is identified as being of the certain brand of cameras.

Figure 2:
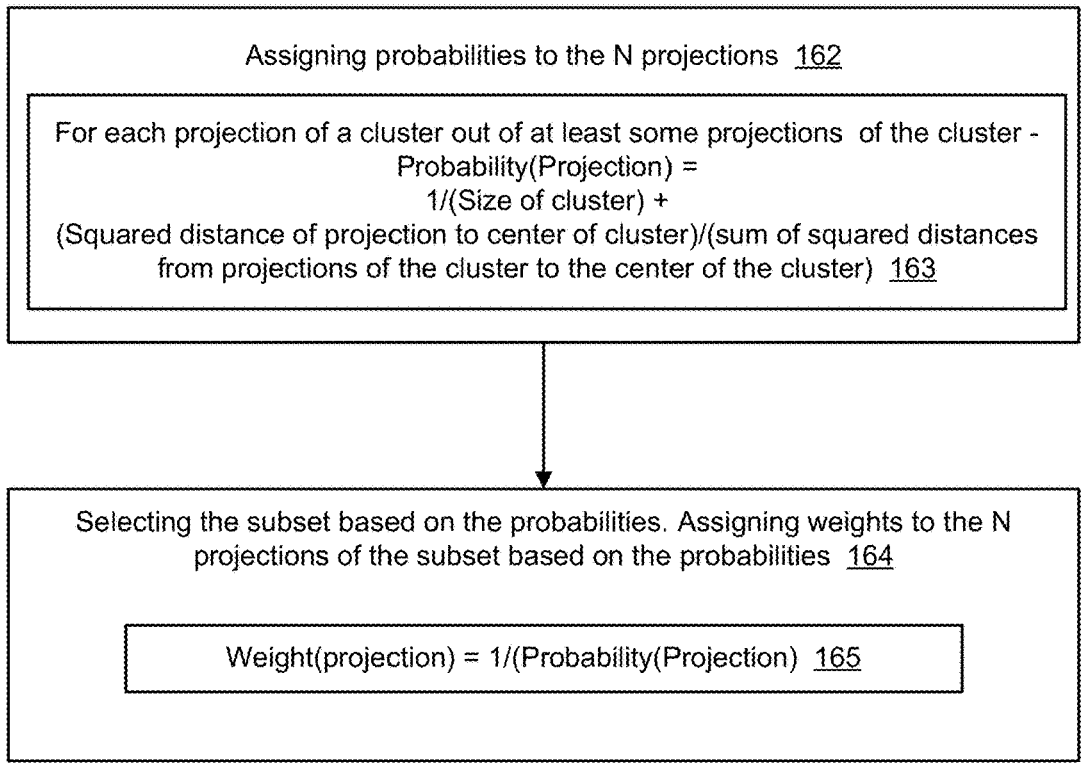
FIG. 2 is an example of some steps of the method of FIG. 1.

Referring to FIG. 2—step 160 may include steps 162 and 164. Step 164 may follow step 162.

Step 162 may include assigning probabilities to the projections of the N points.

Step 164 may include selecting projections to be included in the weighted subset based on the probabilities and assigning weights to the selected projections.

Step 164 may include step 165 of assigning a weight of a selected projection to be a inversely proportional to a probability of the selected projection.

Step 162 may include step 163 of assigning a probability of a projection that belongs to a cluster to be equal to [1/(a size of the cluster)]+[a squared distance of the projection point to a center of cluster)/(a sum of squared distances of all projections of the cluster to the center of the cluster).

Referring to FIG. 3—step 160 may include steps 162 and 164. Step 164 may follow step 162.

Step 164 may follow step 162.

Step 162 may include assigning probabilities to the projections of the N points.

Step 164 may include selecting projections to be included in the weighted subset based on the probabilities and assigning weights to the selected projections.

Step 164 may include step 165 of assigning a weight of a selected projection to be inversely proportional to a probability of the selected projection.

Step 162 may include step 163' of assigning a probability of a projection that belongs to a cluster to be equal to [1/(a size of the cluster)]+[a distance of the projection point to a center of cluster)/(a sum of distances of all projections of the cluster to the center of the cluster)].

Figure 6:
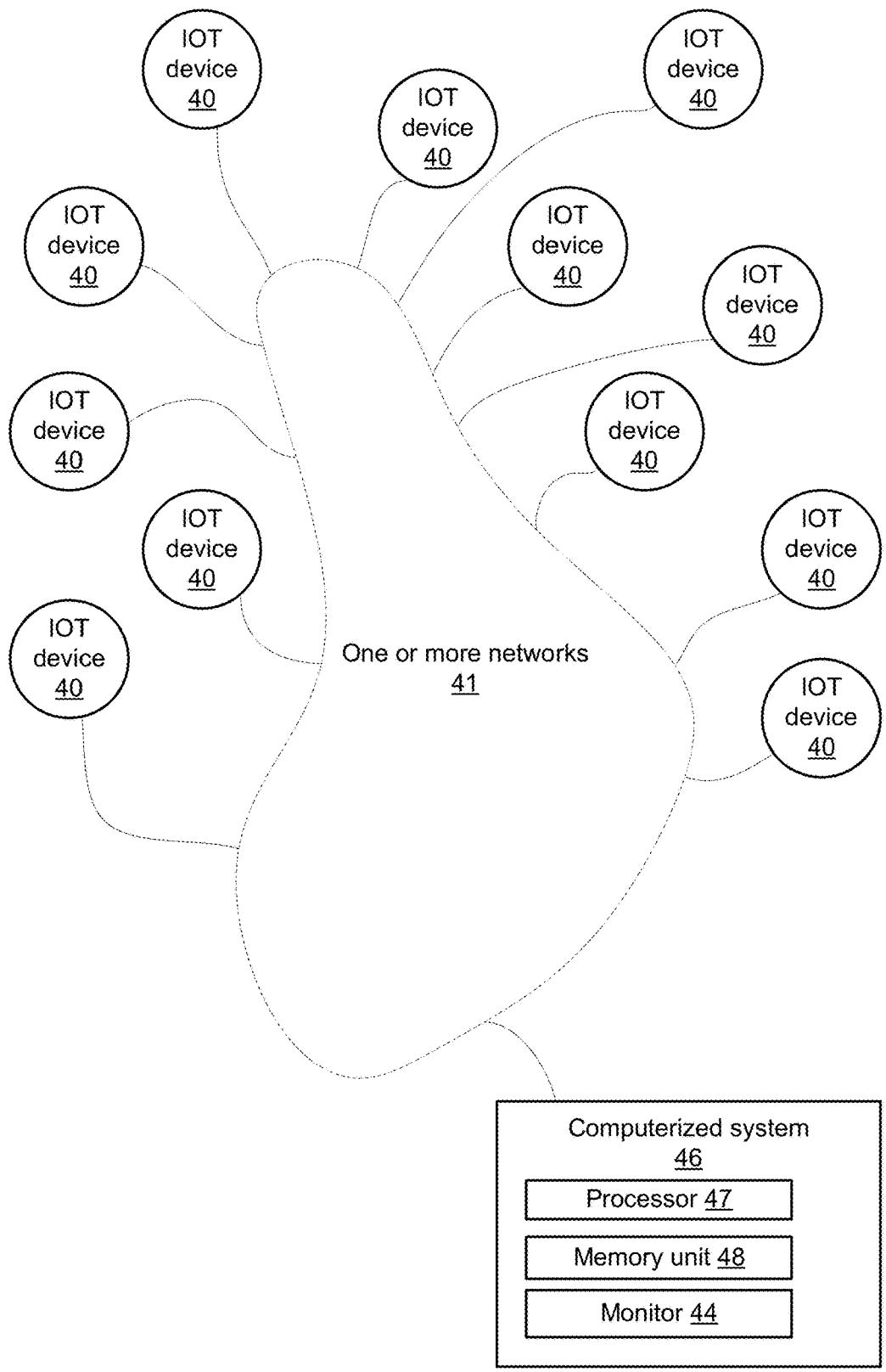
FIG. 6 illustrates an example of a computerized system and its environment.
Figure 7:
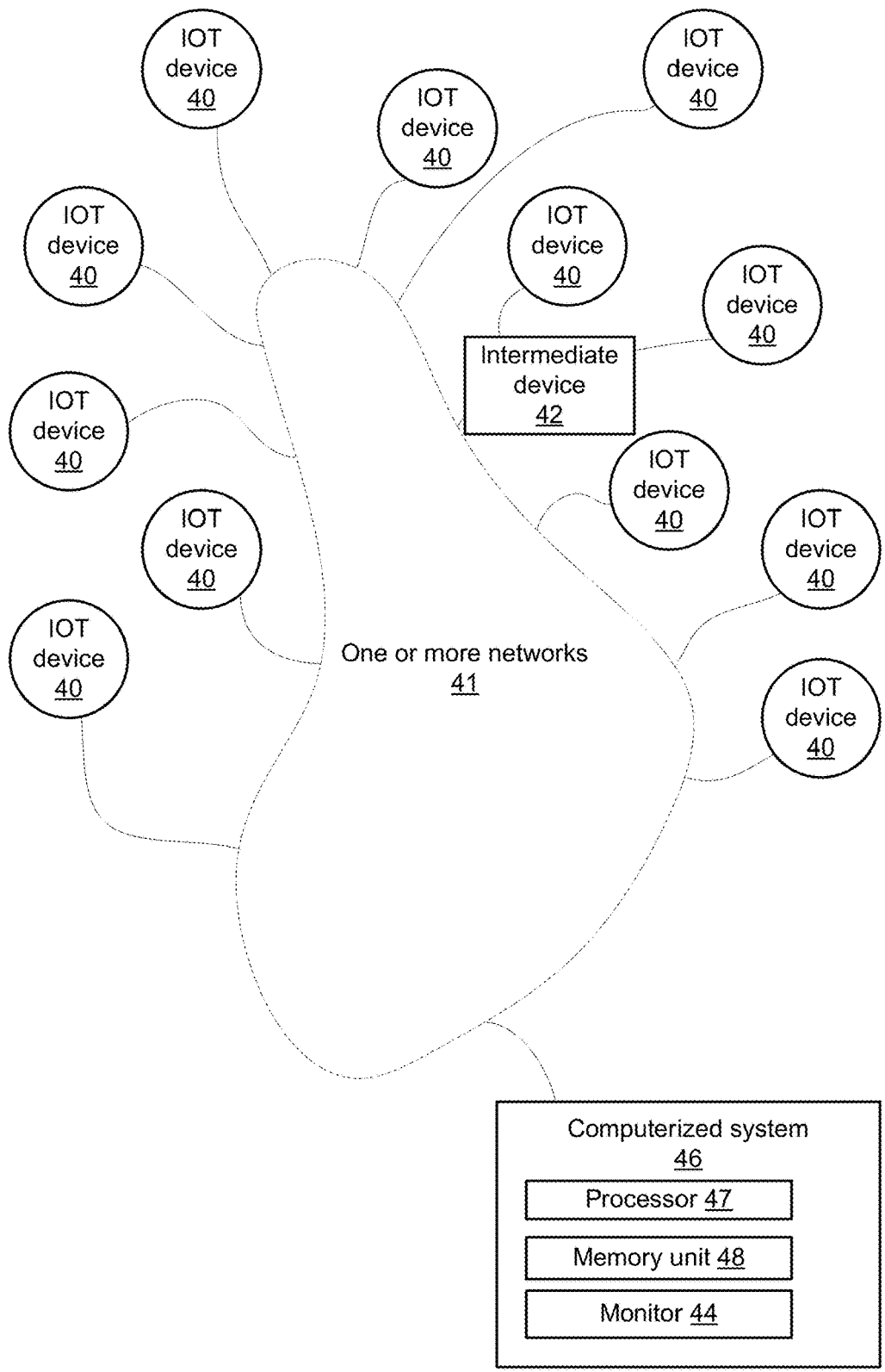
FIG. 7 illustrates an example of a computerized system and its environment.

FIGS. 6 and 7 illustrate a computerized system 46 and its environment.

In FIG. 6 the computerized system 46 is coupled via one or more networks 41 to multiple IOT devices 40. FIG. 7 illustrates that at least some of the IOT devices 40 may be coupled to the one or more networks 41 via an intermediate device 42 such as but not limited to a gateway. The intermediate device may perform at least some of the steps of method 100.

The computerized system 46 may include a processor 47, a memory unit 48 and a monitor 44 and may be configured to execute any of the methods illustrated in the specification and/or drawings and/or claims.

The monitor may provide information regarding the behavior of one or more IOT devices out of IOT devices 40 that are coupled via one or more networks 41 to the computerized system. The monitor 44 may belong to the computerized system 46 or may not belong to the computerized system 46.

The monitor 44 may be a communication monitor or any other monitor.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

We claim:

1. A method for identifying one or more internet of things (IOT) devices, the method comprises:

receiving or generating a first plurality (N) points within a first multi-dimensional space that has M dimensions, M being a positive integer that is smaller than N, wherein the N points represent one or more behaviors of the one or more IOT devices, wherein a clustering of the N points within the first multi-dimensional space results in at least some clusters that are inseparable from each other;

generating a representation of the N points within a second multi-dimensional space that has at least N dimensions, wherein a clustering of the N points within the second multi-dimensional space results in clusters that are separable from each other;

calculating projections of the N points on a sub-space that has a second plurality (Q) of dimensions, wherein the subspace is calculated to minimize a cost function dependent on distances of the N points from the sub-space, and wherein Q is a function of a relationship between a number (K) of clusters and an allowed error ($\varepsilon$);

computing a core-set that comprises a weighted subset of the projections, wherein the subset of the projections includes a number of projections equal to or greater than $K/(\varepsilon^2)$;

clustering the projections of the weighted subset to provide current clusters; and identifying the one or more IOT devices based on a relationship between the current clusters and identification information regarding IOT devices of known identity.

2. The method according to claim 1 wherein the cost function is a sum of squared values of the distances of the N points from the sub-space.

3. The method according to claim 2 wherein the number of projections in the subset of the projections is equal to a round value of $K/(\varepsilon^2)$.

4. The method according to claim 1 wherein Q is a round value of K divided by $\varepsilon$.

5. The method according to claim 1 wherein the core-set has up to a third plurality (s) of projections.

6. The method according to claim 1 wherein the computing of the core-set comprises assigning probabilities to the projections of the N points; selecting projections to be included in the weighted subset based on the probabilities; and assigning weights to the selected projections.

7. The method according to claim 6 wherein a weight of a selected projection is inversely proportional to a probability of the selected projection.

8. The method according to claim 6 wherein a probability of a projection that belongs to a cluster equals [1/(a size of the cluster)]+[a squared distance of the projection point to a center of cluster)/(a sum of squared distances of all projections of the cluster to the center of the cluster)].

9. The method according to claim 6 wherein a probability of a projection that belongs to a cluster equals [1/(a size of the cluster)]+[a distance of the projection point to a center of cluster)/(a sum of distances of all projections of the cluster to the center of the cluster)].

10. The method according to claim 1 wherein the computing of the core-set comprises performing an approximate clustering of the projections, and wherein the clustering of the projections of the weighted subset to provide current clusters comprises performing a full clustering.

11. The method according to claim 10 wherein the identifying of the one or more IOT devices comprises searching for at least one centroid that falls within at least one current cluster.

12. The method according to claim 1 wherein the identification information regarding the IOT devices of known identity comprises centroids that represents the IOT devices of known identity.

13. The method according to claim 1 wherein the generating of the representation of the N points within the second multi-dimensional space comprises or is followed by calculating distances between each one of the N points to each other point of the N points.

14. The method according to claim 1 wherein the behavior of the one or more IOT devices comprises operational activities of the one or more IOT devices.

15. The method according to claim 1 wherein the behavior of the one or more IOT devices comprises one or more communication techniques used by the one or more IOT devices.

16. The method according to claim 1 wherein the behavior of the one or more IOT devices comprises at least one out of a start communicating time, a stop communicating time.

17. The method according to claim 1 wherein the behavior of the one or more IOT devices comprises timing information regarding timings of different packets of a sequence of packets.

18. The method according to claim 1 wherein the behavior of the one or more IOT devices comprises timing information regarding an amount of data within at least one direction of communication.

19. A non-transitory computer readable medium having a set of computer-readable instructions stored thereon, wherein execution of the computer-readable instructions by a computer, results in the computer implementing the following steps:

receiving or generating a first plurality (N) points within a first multi-dimensional space that has M dimensions, M being a positive integer that is smaller than N, wherein the N points represent one or more behaviors of one or more IOT devices, wherein a clustering of the N points within the first multi-dimensional space results in at least some clusters that are inseparable from each other;

generating a representation of the N points within a second multi-dimensional space that has at least N dimensions, wherein a clustering of the N points within the second multi-dimensional space results in clusters that are separable from each other;

calculating projections of the N points on a sub-space that has a second plurality (Q) of dimensions, wherein the sub-space is calculated to minimize a cost function dependent on distances of the N points from the sub-space, and wherein Q is a function of a relationship between a number (K) of cluster and an allowed error ($\varepsilon$);

computing a core-set that comprises a weighted subset of the projections, wherein the subset of the projections includes a number of projections equal to or greater than $K/(\varepsilon^2)$;

clustering the projections of the weighted subset to provide current clusters; and identifying the one or more IOT devices based on a relationship between the current clusters and identification information regarding IOT devices of known identity.

20. A computerized system that comprises a processing circuit and memory that are configured to cooperate in executing the steps of:

receiving or generating a first plurality (N) points within a first multi-dimensional space that has M dimensions, M being a positive integer that is smaller than N, wherein the N points represent one or more behaviors of one or more IOT devices, wherein a clustering of the N points within the first multi-dimensional space results in at least some clusters that are inseparable from each other;

generating a representation of the N points within a second multi-dimensional space that has at least N dimensions, wherein a clustering of the N points within the second multi-dimensional space results in clusters that are separable from each other;

calculating projections of the N points on a sub-space that has a second plurality (Q) of dimensions, wherein the sub-space is calculated to minimize a cost function dependent on distances of the N points from the sub-space, and wherein Q is a function of a relationship between a number (K) of cluster and an allowed error ($\varepsilon$);

computing a core-set that comprises a weighted subset of the projections, wherein the subset of the projections includes a number of projections equal to or greater than $K/(\varepsilon^2)$;

clustering the projections of the weighted subset to provide current clusters; and identifying the one or more IOT devices based on a relationship between the current clusters and identification information regarding IOT devices of known identity.

\* \* \* \* \*